United States Patent

[11] 3,633,970

| [72] | Inventor | James J. Langhals |
| | | Route #3, Columbus Grove, Ohio 45830 |
| [21] | Appl. No. | 878,355 |
| [22] | Filed | Nov. 20, 1969 |
| [45] | Patented | Jan. 11, 1972 |

[54] WELDING TRUCK CONTAINING ALL REQUIRED EQUIPMENT
4 Claims, 6 Drawing Figs.

| [52] | U.S. Cl. | 296/24 |
| [51] | Int. Cl. | B60r 27/00 |
| [50] | Field of Search | 296/44 |

[56] References Cited
UNITED STATES PATENTS

| 2,365,940 | 12/1944 | Couse | 296/24 |
| 316,971 | 5/1885 | Holloway | 296/24 |
| 3,492,042 | 1/1970 | Nachtigall | 296/24 |

Primary Examiner—Philip Goodman
Attorney—Sughrue, Rothwell, Mion, Zinn & Macpeak ABSTRACT: A specially designed truck body and bed, adapted to contain all the necessary equipment for performing welding operations. The truck bed including a platform at its rear end upon which engines may be mounted, and the truck body including a plurality of cabinets accessible from opposite sides of the vehicle for containing various equipment. The body including an open longitudinally central aisle with access being provided by stairs at the front end of the truck.

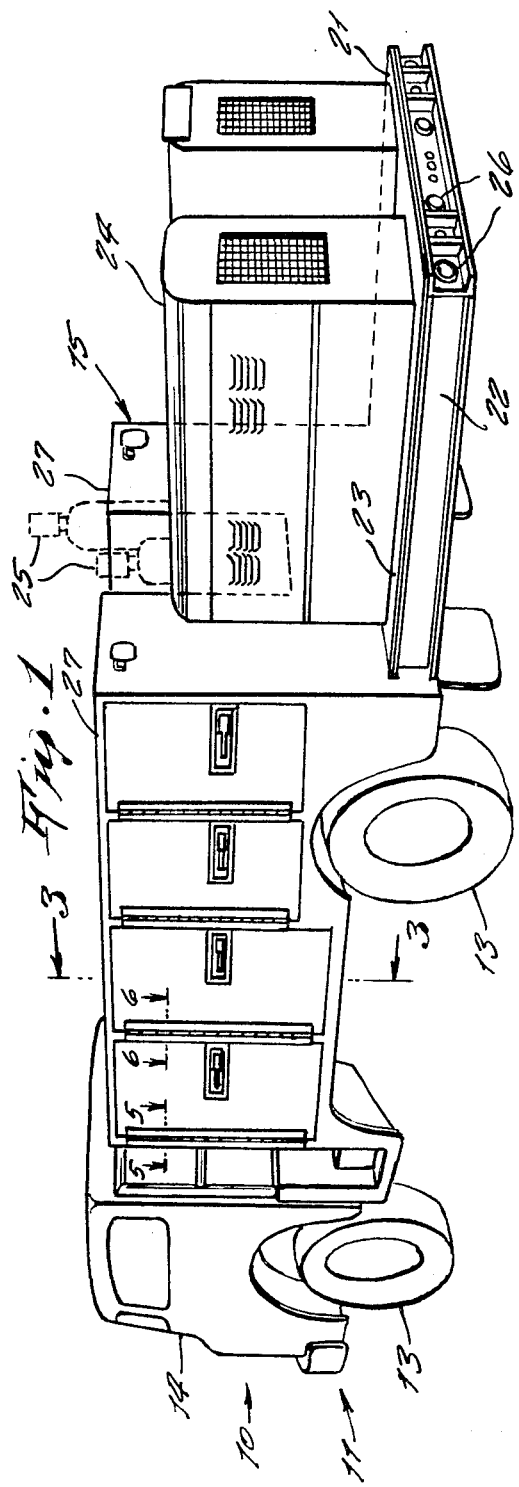
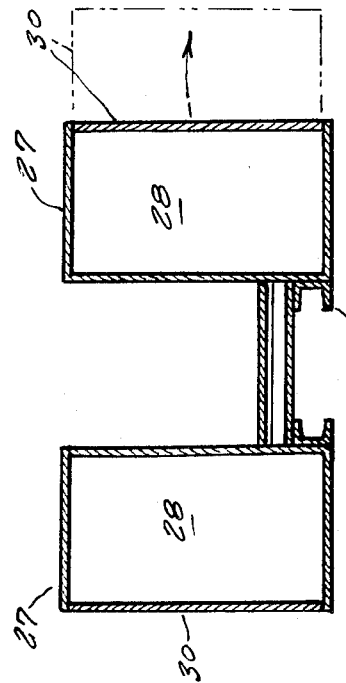
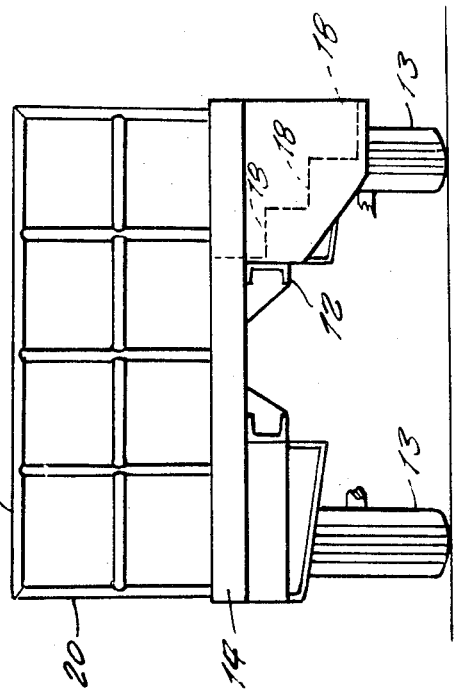
INVENTOR
JAMES J. LANGHALS

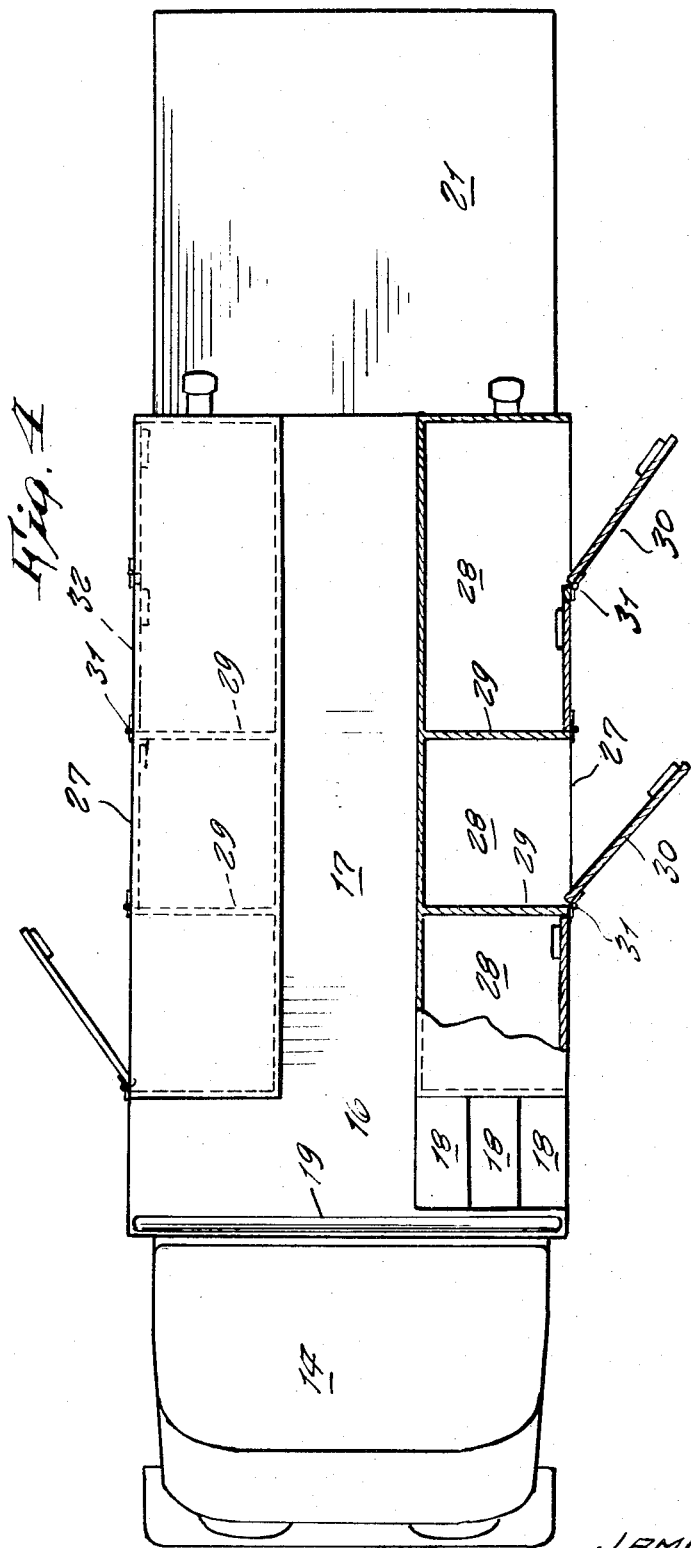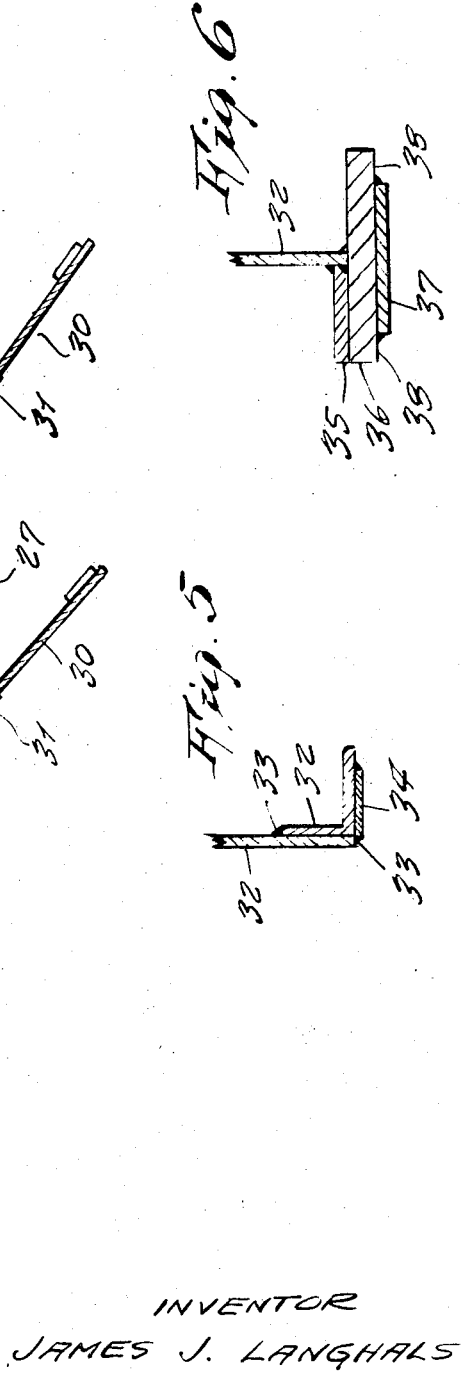
INVENTOR
JAMES J. LANGHALS

WELDING TRUCK CONTAINING ALL REQUIRED EQUIPMENT

BACKGROUND OF THE INVENTION

Field of the Invention

This invention relates generally to truck beds and vehicle bodies.

SUMMARY OF THE INVENTION

A principle object of the present invention is to provide a welding truck having self-contained means so as to be possible to perform all types of welding operations.

Another object of the present invention is to provide a welding truck containing all the required equipment and which can carry to a job all the necessary equipment that is required for any particular job so that the vehicle is completely self-reliant.

Other objects of the present invention are to provide a welding truck containing all the required equipment, and which is simple in design, inexpensive to manufacture, rugged in construction, easy to use and efficient in operation.

BRIEF DESCRIPTION OF THE DRAWINGS

These and other objects will be readily evident upon a study of the following specification and the accompanying drawings wherein:

FIG. 1 is a perspective view of the present invention,

FIG. 2 is a front elevation view of the truck bed and body,

FIG. 3 is a cross-sectional view taken on the line 3—3 of FIG. 1,

FIG. 4 is a top plan view of the welding truck and shown partly in cross section to show the interior of several cabinets, FIG. 5 is an enlarged cross-sectional view taken on the line 5—5 of FIG. 1, and FIG. 6 is an enlarged cross-sectional view taken on the line 6—6 of FIG. 1.

DESCRIPTION OF THE PREFERRED EMBODIMENTS

Referring now to the drawings in detail, the reference numeral 10 represents a welding truck according to the present invention wherein there is a vehicle 11 that includes a chassis 12 mounted upon a plurality of front and rear wheels 13, the chassis supporting a front cab 14, as shown in the drawing.

In the present invention, a truck bed 14 is mounted upon the chassis 12, the truck bed supporting a body 15 thereupon. The truck bed 14 includes a platform 16 which includes a longitudinally extending central aisle 17 and which is accessible by means of a plurality of steps 18 at the front of the bed so to allow a person to enter or leave the platform.

A handrail 19 is positioned transversely across the front end of the bed 14, the handrail being comprised of a plurality of pipes welded together to form a frame 20, as shown in FIG. 2 of the drawing. The frame may further permit securement thereto of various items positioned upon the platform 16.

The bed further includes a rearward extending platform 21 at a lower level than the platform 16, the platform 21 being comprised of eye beams 22 welded together and upon which there is secured a top plate 23.

A pair of engines 24 may be mounted upon the platform 21, as shown in FIG. 1 of the drawing. Welding tanks 25 may be positioned between the engines 24 or upon the aisle of the platform 16. The rear end of the platform 21 may be fitted with appropriate automotive signal lamps 26 such as is required at the rear end of conventional vehicles.

The truck body 15 includes a row of cabinets 27 along each side of the truck, each cabinet being divided into a plurality of compartments 28 by means of partitions 29 therebetween. Access doors 30 mounted upon hinges 31 provide access to the compartments 28 from the outer side of the truck. Eberhard-type locks might be employed for securing the doors in a locked position so to seal the compartments.

As shown in the drawings, and more particularly in FIG. 1 of the drawing, the two forward compartments of the cabinets may extend downwardly a greater distance than the two rear compartments of each cabinet 27.

In a modified design of the present invention, the two large cabinet compartments located forwardly adjacent the steps 18 can be eliminated and replaced by a platform upon which an X-ray machine can be mounted. Also in a modified design, a 5-ton crane of the hydraulic type can be placed in the catwalk or central aisle 17 with an operator's control seat welded on the crane.

The truck then, of course, would be provided with four outriggers placed on the side of the truck so as to stabilize the crane. This crane is not intended to replace cranes, like the Baldwin-Lima-Hamilton type. However, it is intended to do light jobs where it would not be practical for a large crane to do that type of work.

The cabinet construction in FIG. 4 is shown only diagrammatically whereas in FIGS. 5 and 6, a more specific detailed and suggested construction is shown. Thus while in FIG. 4, the cabinet construction may be schematically indicated of a thickness which may suggest plywood construction, it is evident in FIGS. 5 and 6, that the construction would preferably be of sheet metal panels 32 which at their ends are reinforced by angle irons 33 secured thereto by welds 33. Thus the sheet metal panels 32 serve as compartment dividers or partitions 29.

In FIG. 5, a bar 34 is secured by weld 33 to which the hinges 31 are secured. In FIG. 6, there is shown a spacer 35 for a door lock, bars 36 and 37; and a space 38 to where weather stripping may be fastened.

Thus there is provided a welding truck containing all required equipment for performing a welding job in a self-contained manner.

What I now claim is:

1. A self-propelled vehicle adapted especially for welding operations comprising a truck chassis mounted upon a plurality of forward and rear wheels;

a cab adapted for an operator positioned at the forward portion of the chassis;

a truck bed means positioned adjacent the cab and including a first platform having a longitudinal central aisle and integral downwardly extending steps adjacent the cab for providing access to the aisle;

a second platform attached to the truck chassis after the rear wheels and providing a work surface vertically downward from the first platform;

a plurality of lockable cabinets fixedly mounted on the first platform on either side of the central aisle, the cabinets having partitions to provide a plurality of compartments, and motor means mounted on the work surface of the second platform for providing power to perform welding operations.

2. A vehicle as in claim 1, where the plurality of cabinets are attached directly on either side of the truck chassis below the central aisle.

3. A vehicle as in claim 1, where the cabinets open outward from the first platform and the cabinets adjacent the cab are larger than the cabinets adjacent the second platform.

4. A vehicle as in claim 3, where the steps extend inward from the peripheral edge of the first platform and the cabinets are attached directly to the side of the truck chassis.

* * * * *